April 19, 1927.
F. HELBIG
1,625,082
METHOD OF HEATING FURNACES
Filed March 21, 1923
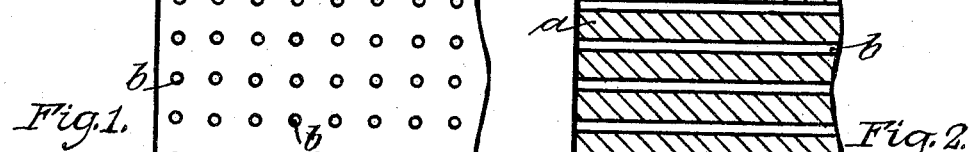
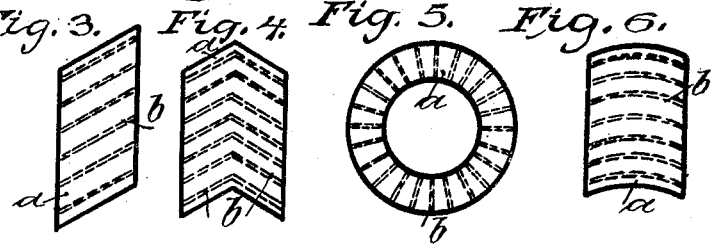
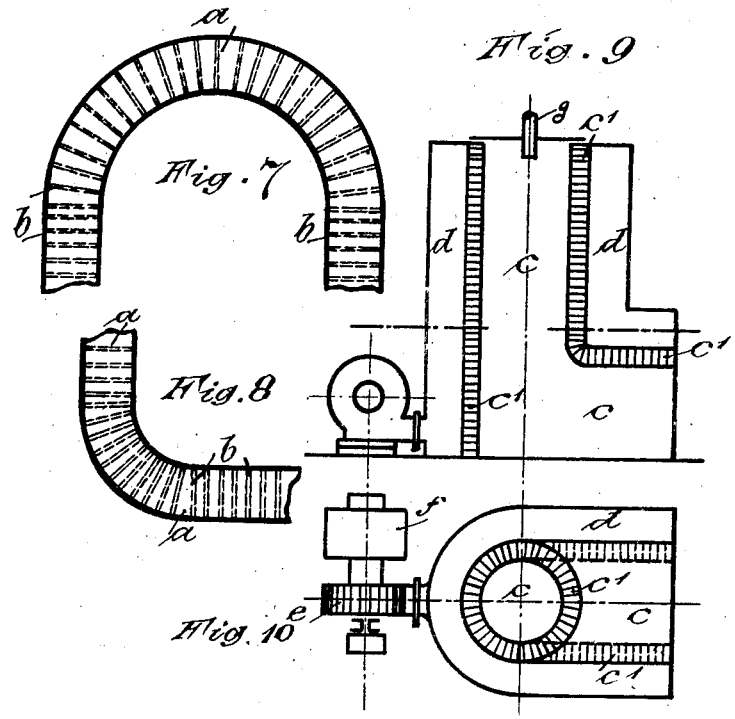
Inventor:
Friedrich Helbig Patented Apr. 19, 1927.

1,625,082

UNITED STATES PATENT OFFICE.

FRIEDRICH HELBIG, OF KARLSRUHE, GERMANY.

METHOD OF HEATING FURNACES.

Application filed March 21, 1923, Serial No. 626,644, and in Germany May 17, 1921.

The object of this invention is to enable finely divided solid fuel, or liquid fuel, or gaseous fuel of high calorific value, to be burned in fire-brick furnaces with air supplied in approximately that proportion which is required for perfect combustion, so that the fire gases are delivered for duty at nearly the maximum temperature theoretically obtainable with the fuel used, this result being achieved without so shortening the life of the furnace lining that the advantages to be had from the high working temperature are out-weighed by excessive cost of furnace upkeep.

The conditions under which maximum temperatures are obtainable by the combustion of powdered or fluid fuel have already been studied, and are well understood, but heretofore it has been a common practice deliberately to abstain from producing such temperatures, because the rapid destruction of the furnace lining was found to render them uneconomical. For this reason it has been usual to work with an excess of air, though in a great number of cases this deliberate reduction of flame temperature involves a loss of efficiency which is perfectly recognized. It is, for example, obvious that in boiler practice and oven practice the reduction of flue temperature involves reduction in the rate of heat transfer, and consequently necessitates a larger area of heating surface for a given output. Where an excess of air is used the combustion chamber itself must also be larger than where the amount of air is only approximately that which is required for perfect combustion.

To allow of working economically with approximately the maximum combustion temperatures obtainable with powdered or fluid fuel, without excessive cost of furnace upkeep due to renewals of the lining, I burn the fuel with approximately the calculated quantity of air in a combustion chamber whose walls are composed throughout of fire bricks having small and densely disposed perforations, through which the air for combustion, or a large part thereof, is injected into the chamber, the cooling of the brickwork by the passage of the air therethrough being sufficient to keep its temperature below the softening or melting point, notwithstanding the higher temperature inside the chamber.

The use of perforated fire-brick walls, through which air for combustion is injected into a furnace, is not broadly novel, and it has already been recognized that the injection of air through such bricks will cool the lining and tend to prolong its life. The distinctive novel feature of my invention is that the whole of the combustion chamber is lined with bricks having perforations distributed throughout the wall surface, so that the cooling effect of the air injected through the holes enables the furnace as a whole to withstand the temperature of combustion of powdered or fluid fuel burned without, or substantially without, excess of air, the flame being delivered for duty at approximately the maximum temperature obtainable by combustion of the fuel.

By thus finely subdividing the air, the combustion of the finely subdivided fuel will occur in a manner resembling in a certain sense the combustion of liquid fuel in the cylinders of internal combustion engines.

In speaking of the condition of the air in the furnace according to my invention, I wish to imply that in contradistinction to the introduction of air in streams wherein mainly the outer layer comes in contact with the walls of the air conduits, I introduce air through the walls of the furnace under conditions which cause the air, while passing through the walls, to be set whirling throughout its mass in an irregular manner, so as to substantially prevent any air particles from flowing in parallel. By causing the air to pass under comparatively low pressure above normal through long narrow conduits approaching the capillary order, I cause all the particles of air to come in contact with the heated walls of these conduits and to abduct from them more heat than the streams or jets of air spoken of above, while at the same time it leaves the inner ends of these conduits in a state of finest subdivision and irregular movement. The turbulence thus prevailing in the body of air passing through the conduits has for its effect to break up the streams which may have primarily formed into incoherently moving minute quantities when it enters the combustion chamber.

The term "capillary" as used in this specification and the claims appended thereto, is meant to designate a substantially long conduit or passage approaching, if not belonging, to the capillary order, which is the equivalent of a conduit whose diameter is such, that a mass of air passing through under comparatively low pressure above the normal, will be set whirling in an irregular manner throughout, by contact with the walls of the conduits.

In the drawings affixed to this specification and forming part thereof bricks embodying my invention and a furnace composed of such bricks are illustrated diagrammatically by way of example. In the drawings—

Figs. 1 and 2 are a plan and a sectional view, respectively, of part of a brick according to this invention, drawn to a greatly enlarged scale.

Figs. 3 to 8 are diagrams showing differently formed bricks of the kind claimed and which are all traversed by narrow holes or channels.

Fig. 3 showing a rhomboidal and

Fig. 4 an angularly formed brick, while

Fig. 5 shows a tubular brick with radial holes.

Fig. 6 is a brick having curved end faces, the perforations extending parallel to these faces.

Figs. 7 and 8 are diagrams illustrating curved bricks of a different configuration.

Fig. 9 is a vertical section and

Fig. 10 is a plan view of a furnace constructed in accordance with the present invention.

Referring to the drawings, $a$ (Figs. 1 and 2) is a small piece of a brick and $b\,b$ are narrow perforations or channels extending through such brick, these perforations or channels being preferably evenly distributed over the brick, but without being necessarily spaced apart in the methodic and uniform manner conventionally shown in the drawing. The perforations or channels are shown here as extending in straight lines right through the brick, but they may as well be curved in any desired manner (Fig. 6). The bricks themselves may be rectangular cubes or prisms, or else they may assume any other desired forms as shown in Figs. 3 to 8, and the channels $b$ may extend through the brick in parallel with the lateral faces of the brick; or radially, if the brick be annular (Fig. 5) or elliptic (Fig. 7). By employing angular channels as shown for instance in Fig. 4 the traveling speed of the fire gases can be reduced, the air escaping from the channels being then directed counter to the gas current.

The furnace $c$ shown in Figs. 9 and 10 is surrounded by perforated bricks $c'$, $d$ being a closed chamber surrounding the brick walls and communicating with a blower $a$ serving to force air through the brick $c'$ into the furnace $c$. In order that this air be free of dust, a filter $f$ may be disposed in front of the blower. $g$ is a tube serving for the introduction of pulverized or liquid or gaseous fuel which is forced in the form of a finely divided spray.

The minute air jets, forced through the said holes, are already highly heated when they issue therefrom into the combustion chamber, and penetrate deeply into the stream of fuel gases. By reason of their great tenuity they become mixed with the gases at once, this action being assisted by the whirling or eddying which is set up. By this means the amount of air required, and the time and path of combustion, are reduced to a minimum. The resulting reduction in the size of the combustion chamber is a further material advantage, as it allows of an important saving in firebrick.

The air may be preheated, and before entering the holes it may be passed through an air filter of any suitable type into an air chamber surrounding the furnace. To prevent heat losses, the said air chamber may be lagged, especially if pre-heated air is used.

The heat given off to the brickwork by the fuel and gases of combustion is absorbed by the injected air and carried back into the combustion chamber. The very large number of uniformly and closely disposed minute air channels causes this heat exchange between the brickwork and air to take place with great thoroughness.

The injection of the air through the multitudinous air holes produces at the inner surface of the brickwork a screen or thin zone of cool gas whereby the flying particles of ash and clinker are kept away from the brick, and the same thus remains clean. At the same time this gas screen affords effective protection against radiated heat, which is in part absorbed before it reaches the brick. This thin gas screen thus affords advantages of very great importance, and it can only be produced by having minute air holes distributed uniformly in very great numbers over the surface. A smaller number of large holes, or a few accidental pores or crevices would be quite ineffective for the purpose.

It will be seen that the injected combustion air serves the dual purpose of cooling the brickwork and keeping it clean, and if it is forced in an adequate quantity the fire brick is kept down to a safe temperature, entirely harmless to it, though the flame temperature attains the highest value, and softening and fusing of the brick are entirely out of question. The bricks so made are the first which can effectively be kept at a temperature materially below the flame temperature in the combustion chamber and consequently the first to allow exceptionally high temperatures to be attained in practice by burning fuel of any kind in a brickwork furnace with the theoretically correct proportion of air.

In Figs. 9 and 10, c designates a furnace chamber, with walls c' of bricks perforated in accordance with the invention, the perforations being indicated by the transverse lines. Around the furnace is a jacket or casing d, into which the air is injected by a pump or fan e, and whence the air passes through the bricks into the furnace chamber. The air is sucked through a filter f, so that it is free from dust when it reaches the air passages in the bricks. The furnace here shown has a pipe g for feeding it with liquid, gaseous or finely powdered fuel.

By changing the air pressure in the air container around the combustion chamber the rate of injection of air through the bricks to the combustion chamber can be regulated as required. A greater or less quantity of air will be injected, according to the quantity of fuel to be burnt, and by this method of regulation the working of the furnace can be performed with any desired excess of air.

By reason of the very fine division of the air the rapid preheating thereof is effected in the most simple manner. The combustion chamber can be of any convenient shape, but in general it will be desirable to have the paths of the air jets through the brick as short as possible, and of equal length.

The brickwork with air passages as described is applicable to use throughout the whole range of furnace work, especially, however, in cases where high and maximum temperatures are required, as for example in blast-furnaces, kilns (where appropriate cooling prevents the breaking of the goods to the kiln walls), rotary furnaces, Martin furnaces, arches for automatic firing, ignition chambers for fuel dust, oil and gases and hearths for oxidizing and reducing furnaces for the chemical and metallurgical industries, where the cooling gas may be used for oxidizing or reducing. The bricks with minute passages therein may also be used for structures such as baffles and the like in the path of the gases of combustion, to increase the generally short life of such structures.

I wish it to be understood that I do not desire to be limited to the exact operations nor to details of construction shown and described, for obvious modifications will occur to a person skilled in the art.

I claim:—

1. The method of producing high temperatures in a furnace which consists in spraying the fuel into the combustion chamber of the furnace and jetting air through multitudinous passages distributed throughout the walls of the chamber, the passages being of such size as to utilize the turbulent action of the friction of the air on the walls of the passages to effect the entire body of the air passing therethrough with respect to the relatively large aggregate of interior surfaces of the passages for cooling purposes.

2. The method of producing high temperatures in a pulverized fuel furnace which consists in feeding finely divided fuel into the combustion chamber and injecting the air to support combustion under pressure into said chamber through relatively fine passages uniformly distributed throughout the walls of the chamber, the cross sectional area of each of the passages being sufficiently small to produce a turbulence of the entire body of the air passing therethrough under pressure to thereby cause all of said air to contact with the passage walls and effect transference of the heat to the air.

3. The method of producing high temperatures in a furnace which consists in spraying the fuel in a finely divided state into a combustion chamber of the furnace, and jetting air through relatively fine passages thereby producing a high degree of turbulence throughout the entire body of air, and into the fuel stream in directions intersecting the same at such velocity as to cause an intimate admixture of the air with the fuel while preventing contact of the fuel with the walls of the chamber, and controlling the effective cooling action of the walls by regulation of the pressure of said air and incident thereto a variation of the turbulence of the air within the passages.

4. The method of burning finely divided fuel at a high temperature, consisting in forming a continuous flow of such fuel and causing air under pressure to be subdivided into a multitude of fine turbulent jets of such size as to have no undisturbed portion and moving substantially transversely to the direction of flow of said fuel.

5. A furnace comprising walls of refractory material surrounding a chamber, means for creating a continuous flow of finely divided fuel through said chamber substantially out of contact with said walls, and means for forcing air into said chamber through a multitude of substantially capillary perforations evenly distributed in parts of said walls.

6. A furnace comprising walls of refractory material surrounding a chamber, means for creating a flow of finely divided fuel through said chamber substantially out of contact with the walls, said walls having a multitude of passages therethrough, and means for introducing air under pressure into the chamber through the passages, said passages being sufficiently fine for the friction disturbance of the air against the walls to extend throughout the current of air passing therethrough.

7. A furnace comprising walls of refractory material surrounding a chamber, means for feeding fuel in a finely divided state through said chamber, said walls having a multitude of uniformly distributed air passages therethrough sufficiently fine for the friction disturbance of the air against the walls to extend throughout the current of air when introduced under pressure, and means for introducing the air through said passages with such pressure as to cause a turbulence therein to bring all of the air passing therethrough into frictional contact with the passage walls as aforesaid.

8. A refractory brick for use in the construction of furnaces comprising a multitude of evenly distributed substantially capillary perforations extending through the brick.

In testimony whereof I affix my signature.

FRIEDRICH HELBIG.